United States Patent
Strobel

(10) Patent No.: US 6,322,235 B1
(45) Date of Patent: Nov. 27, 2001

(54) LIGHT REFLECTOR

(76) Inventor: Markus Strobel, Malsenstr. 53, 80638 München (DE)

( * ) Notice: Subject to any disclaimer, the term of this patent is extended or adjusted under 35 U.S.C. 154(b) by 0 days.

(21) Appl. No.: 09/488,805

(22) Filed: Jan. 21, 2000

(30) Foreign Application Priority Data

Jan. 21, 1999 (DE) .............................................. 299 00 991

(51) Int. Cl.⁷ .................................................. F21V 7/00
(52) U.S. Cl. ........................... 362/297; 362/346; 362/16; 362/18
(58) Field of Search .............................. 362/16, 297, 346, 362/347, 343, 18; 359/546

(56) References Cited

U.S. PATENT DOCUMENTS

| | | | |
|---|---|---|---|
| 1,935,045 | * 11/1933 | Doane | 362/18 |
| 3,803,401 | * 4/1974 | Drews | 362/217 |
| 4,428,030 | * 1/1984 | Baliozian | 362/18 |
| 4,460,946 | * 7/1984 | Tinz | 362/319 |
| 4,616,293 | * 10/1986 | Balliozian | 362/320 |
| 4,833,571 | * 5/1989 | Granovsky | 362/16 |
| 5,508,902 | * 4/1996 | Shoemaker | 362/346 |
| 5,568,680 | * 10/1996 | Parker | 362/347 |
| 6,152,579 | * 11/2000 | Reed et al. | 362/320 |

* cited by examiner

Primary Examiner—Thomas M. Sembers
(74) Attorney, Agent, or Firm—Henry M. Feiereisen

(57) ABSTRACT

A light reflector for photographing, filming or taping, especially for outdoor shooting, includes a plurality of panels of identical size and having at least one reflecting side, and connectors for butt-jointing the panels to one another. Abutting panels are joined together at their edges by connectors of U-shaped configuration, whereas the interconnection of four contiguous panels is realized in the center by connectors in the form of two metal plates which are secured to one another by a central screw bolt.

15 Claims, 2 Drawing Sheets

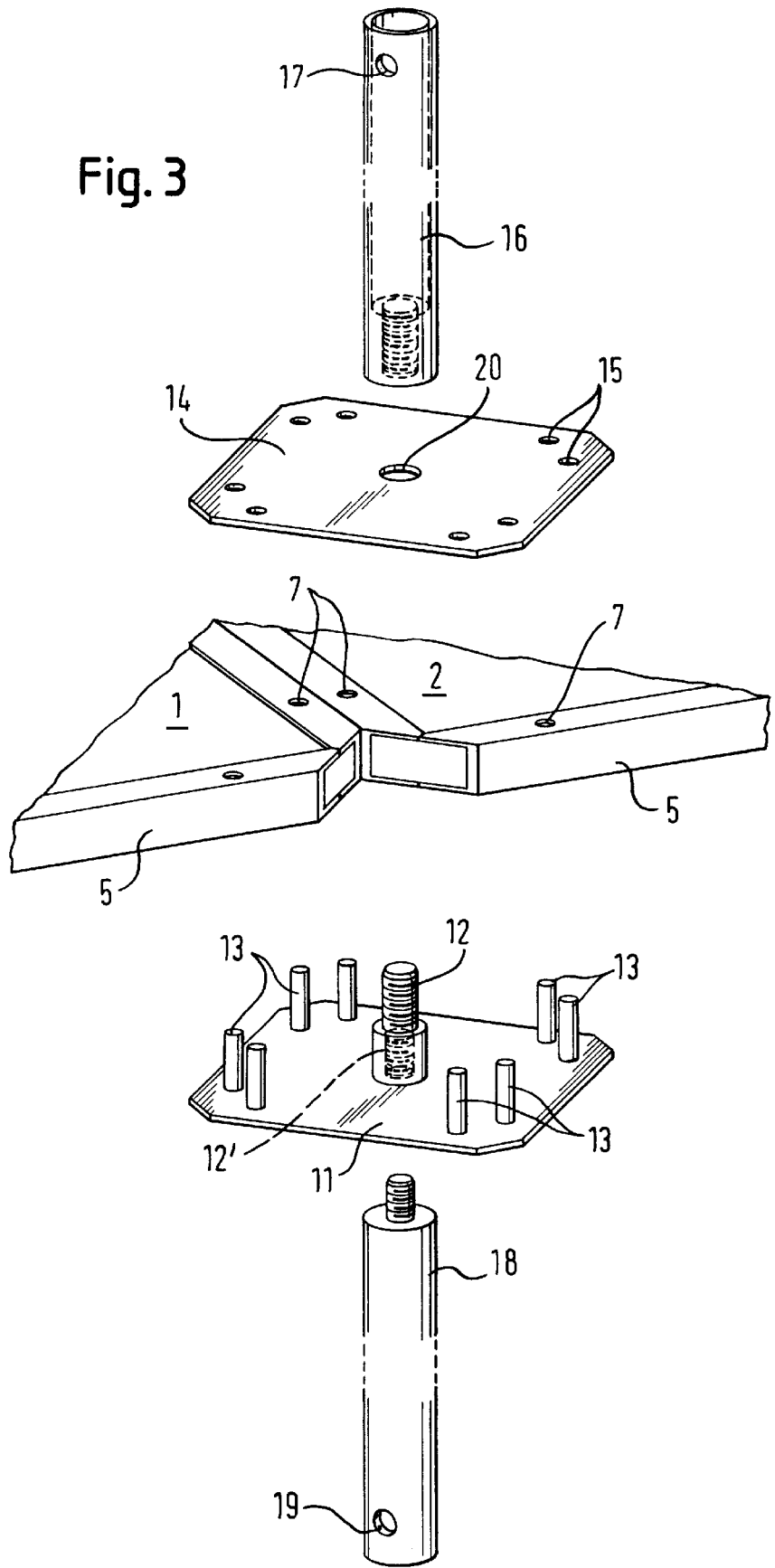

LIGHT REFLECTOR

CROSS-REFERENCES TO RELATED APPLICATIONS

This application claims the priority of German Patent Application Serial No. 299 00 991.2, filed Jan. 21, 1999, the subject matter of which is incorporated herein by reference.

BACKGROUND OF THE INVENTION

The present invention relates, in general, to a light reflector for use in photographing, filming or taping, especially for outdoor shooting.

The use of collapsible reflectors of metallized fabric is known in the art. These types of reflectors have only a slight flexural strength and thus are not sufficiently stable to realize a secure and constant brightening of an object being shot so that their outdoor use is rather limited in view of possible exposure to extreme wind and weather conditions. The problem of lacking stability of such collapsible reflectors could be overcome by employing large, rigid reflectors. As a consequence of their great dimensions, these reflectors are, however, unsuitable for a rapid, mobile use.

SUMMARY OF THE INVENTION

It is thus an object of the present invention to provide an improved light reflector, obviating the afore-stated drawbacks.

In particular, it is an object of the present invention to provide an improved light reflector, which is sufficiently rigid to withstand weather influences and wind influences while yet is suitable for rapid, mobile use.

These objects, and others which will become apparent hereinafter, are attained in accordance with the present invention by a light reflector, which includes a plurality of panels of same size and having at least one reflecting side, and connectors butt jointing the panels to one another.

A light reflector according to the present invention is thus designed as a modular system, which exhibits a high flexural strength in view of the panel construction and thus is suitable for outdoor use even at extreme weather conditions. The light reflector can be dismantled without effort and thus is easy to transport and suitable for mobile use as a consequence of its modular configuration.

According to another feature of the present invention, the panels may be of rectangular configuration, and may be made of rigid foam. Panels of rigid foam are relatively light and yet display a sufficient flexural strength.

A desired reflective capability of the reflector can be accomplished by laminating a reflecting film at least on one side of the panels. Suitably, both sides of the panels are so configured that their reflective capabilities are different. This may be realized, for example, by laminating reflecting films of varying reflective characteristics on both sides of the panels. Thence, the light reflector according to the present invention offers a wide variety of applications.

According to another feature of the present invention, the panels are each enclosed by frames of profiled strips to enhance the stability of the light reflector and to protect the edges of the panels. The profiled strips may have a U-shaped configuration and may be made of aluminum that is light, exhibits a stable shape and is reflective.

The connection of abutting panels may be realized by connectors of U-shaped configuration which can be pushed over the edges of abutting panels and thereby bridge the joint therebetween. The U-shaped connectors may be attached to the panels in a form-fitting manner, or may be swingably mounted to one end of the panels.

According to another embodiment of the present invention, each of the panels has in each of its edges a bore in the area of each corner, and each of the connectors includes two bores which are spaced at a distance which is twice the distance from the panel bore to the nearest corner, so that the bores of the connectors can be brought into alignment with the bores of the panels for engagement of suitable cotter pins.

According to another feature of the present invention, the connection between adjoining panels may also be realized by a tension lever type locking mechanism.

A further stability of the light reflector can be realized by interconnecting four or more panels in their center, or in the area where their corners meet, with two metal plates between which the panel corners are disposed and which serve as central connector.

According to another feature of the present invention, the corners of all panels are slanted, and the metal plates are clamped to one another by a central screw bolt. As a consequence of the slanted configuration of the corners of each panel, there is always an opening in the area where the corners of four contiguous panels meet, for passage of the screw bolt, regardless of the orientation of a single panel.

Suitably, one of the metal plates has eight pins for traversal of eight bores, respectively provided in the borders of four adjoining corner areas of the panels and for insertion in aligned holes formed in the other metal plate.

Optionally, the light reflector according to the present invention may include a mounting for attachment to a head portion of a stand, tripod and/or other auxiliary parts.

BRIEF DESCRIPTION OF THE DRAWING

The above and other objects, features and advantages of the present invention will be more readily apparent upon reading the following description of preferred exemplified embodiments of the invention with reference to the accompanying drawing, in which:

FIG. 3 is an exploded, perspective illustration, on an enlarged scale, of a central connector for interconnecting panels of the light reflector of FIG. 1.

DETAILED DESCRIPTION OF PREFERRED EMBODIMENTS

Figure 1:
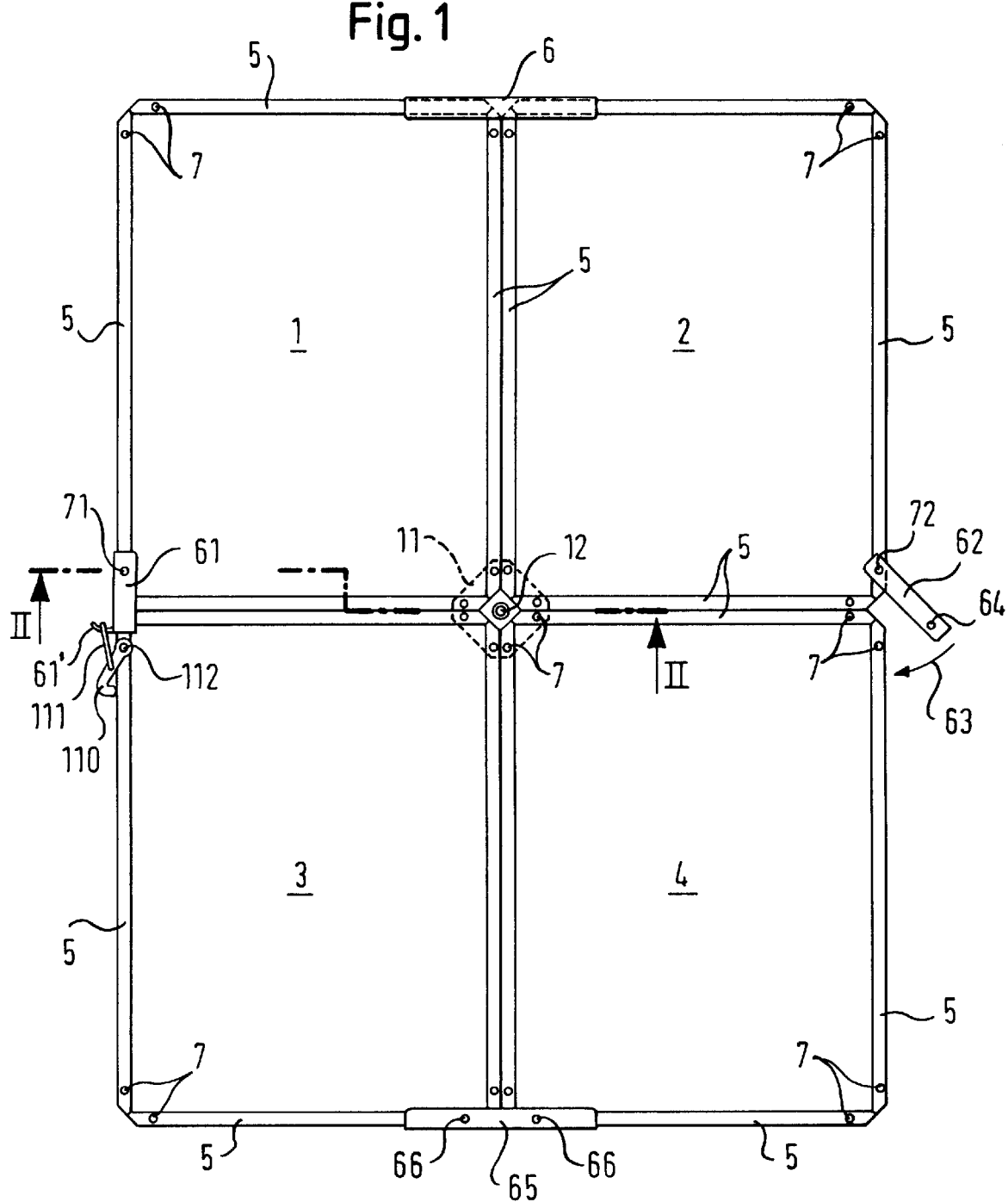
FIG. 1 is a top view of a light reflector according to the present invention.

Throughout all the Figures, same or corresponding elements are generally indicated by same reference numerals.

Turning now to the drawing, and in particular to FIG. 1, there is shown a top view of a light reflector according to the present invention, including four rectangular panels 1, 2, 3, 4 which are preferably made of rigid foam and have opposite sides laminated with reflective films 31, 32. The reflective capability of the films 31, 32 may be the same or different. The panels 1, 2, 3, 4 have a same size and may have outer dimensions of, e.g., 60×80 cm and a width of 1 cm.

Each of the panels 1, 2, 3, 4 is enclosed by a frame comprised of a continuous profiled strip 5 or of four individual profiled strips 5, which may be made, for example, of aluminum, and are slanted at the corners at an angle of 45°.

In symmetry to their corners, the profiled strips 5 and the panels 1, 2, 3, 4 are formed with bores 7. The profiled strips 5 may be pushed onto the panels 1, 2, 3, 4 in a form-fitting manner.

In the area of their outer edges, the panels 1, 2, 3, 4 are interconnected by U-shaped connectors which may also be made of aluminum. These connectors may be configured in various manner, as shown in FIG. 1 with reference to four different embodiments. Persons skilled in the art will understand that the common depiction of four types of connectors in FIG. 1 is done for illustrative purposes only.

A first embodiment is shown by way of example for interconnection of the panel 1 with the panel 2 by using a U-shaped connector 6 which is of such design that it can simply be pushed in a form-fitting manner over adjoining profiled strips 5.

Figure 2:
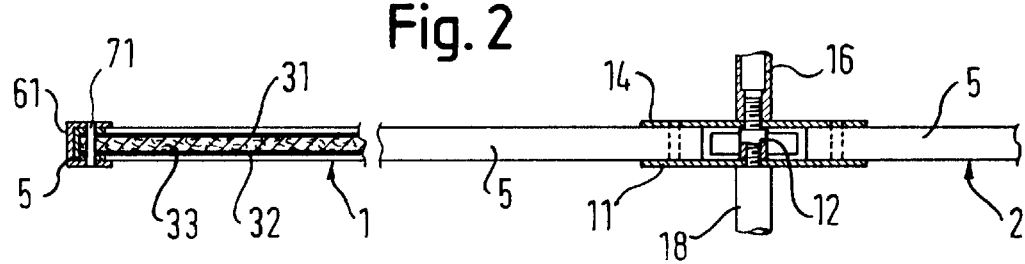
FIG. 2 is a sectional view of the light reflector of FIG. 1, taken along the line II—II in FIG. 1.

A second embodiment is shown by way of example for interconnection of the panel 3 with the panel 1 by using a U-shaped connector 61 which has one end swingably mounted at 71 to the respective profiled strip 5, as also shown in FIG. 2. At its other end, the U-shaped connector 61 is connected to a short bracket 61' for engagement of a long, forked bracket 111 of a tension lever 110. The tension lever 110 is swingably mounted at 112 to the respective profiled strip 5 of the panel 3.

A third embodiment is shown by way of example for interconnection of the panel 2 with the panel 4 by using a U-shaped connector 62 which is swingably mounted to the profiled strip 5 of the panel 2 for rotation about a pivot axis 72 in the direction of arrow 63. The U-shaped connector 62 has a bore 64 which can be brought into alignment with a bore 7 in the profiled strip 5 of the panel 4, when pivoting the connector 62 inwardly toward the panel 4, for insertion of a safety bolt, cotter pin or like element.

A fourth embodiment is shown by way of example for interconnection of the panel 3 with the panel 4 by using a U-shaped connector 65 which has two bores 66 which are spaced from one another at a distance which is twice the distance of the bores 7 (not visible in the illustration of FIG. 1) to a nearest corner of the panels. Thus, the bores 66 can be brought into alignment with two bores 7 of abutting profiled strips 5 for insertion of cotter pins. Cotter pins are generally known in the art and come in various configuration and thus are not shown in detail for the sake of simplicity.

As further shown in FIG. 1, the panels 1, 2, 3 4 are additionally interconnected in the center of the light reflector, i.e. the area of the contiguous four slanted corners, by two metal plates 11, 14 which are shown in more detail in FIG. 3. The lower metal plate 11, which is also shown by way of broken lines in FIG. 1, supports in the center a central threaded bolt 12 and is formed about the perimeter with eight upright pins 13 which are in alignment with the bores 7 in the four corner areas of the panels 1, 2, 3, 4. The upper metal plate 14 is formed with eight holes 15 which are in alignment with the pins 13 and the bores 7. In addition, the upper metal plate 14 has a central opening 20 for passage of the threaded bolt 12. A clamping of the upper metal plate 14 to the lower metal plate 11, after proper positioning in conjunction with the four panels 1, 2, 3, 4, is realized by a threaded sleeve 16 which can be rotated onto the threaded bolt 12.

In order to permit an attachment of the light reflector to a stand, tripod and/or other auxiliary parts, the threaded sleeve 16 includes a transverse bore 17 by which the light reflector can be secured, e.g. to the head portion of the stand. The threaded bolt 12 has also a threaded bore 12' for attachment of a screw bolt 18 which is formed with a transverse bore 19 to provide another option for attachment of the light reflector to the head portion of a stand.

While the invention has been illustrated and described as embodied in a light reflector, it is not intended to be limited to the details shown since various modifications and structural changes may be made without departing in any way from the spirit of the present invention.

What is claimed as new and desired to be protected by Letters Patent is set forth in the appended claims:

1. A flat modular light reflector, comprising a plurality of flat panels of same size and having at least one reflecting side; and connecting means butt-jointing the panels to one another, thereby effecting a substantially flat configuration of the light reflector, wherein the connecting means includes two metal plates for interconnecting four contiguous panel corners which are positioned between the metal plates, and fastening means for securing the metal plates to one another, wherein the panel corners are slanted, said fastening means including a central threaded bolt and a threaded sleeve for clamping the metal plates to one another.

2. The light reflector of claim 1 wherein each of the panels has a rectangular configuration.

3. The light reflector of claim 1 wherein each of the panels is made of rigid foam.

4. The light reflector of claim 1 wherein the panels have opposite sides exhibiting different reflective capabilities.

5. The light reflector of claim 1, and further comprising a plurality of frames of profiled strips, each of the frames of profiled strips enclosing a corresponding one of the panels, whereby the frames and the panels are placed into one-to-one correspondence.

6. The light reflector of claim 1 wherein the connecting means includes connectors of U-shaped configuration, said connectors being adapted for placement over edges of abutting panels, thereby bridging a joint between the abutting panels.

7. The light reflector of claim 5 wherein the connecting means includes connectors of U-shaped configuration, said connectors being adapted for placement in a form-fitting manner over edges of abutting profiled strips of adjacent panels, thereby bridging a joint between the abutting profiled strips.

8. The light reflector of claim 6 wherein the connectors have one end swingably mounted to one of the abutting panels.

9. The light reflector of claim 6 wherein the connectors have one end swingably mounted to one of the abutting profiled strips.

10. The light reflector of claim 1 wherein the connecting means includes connectors of U-shaped configuration for placement over edges of abutting panels, thereby bridging a joint between the abutting panels, each of the abutting panels including a marginal bore in an area of each corner, and each of the connectors including two bores spaced at a distance which is twice the distance of the marginal bore to a nearest corner, so that the bores of the connectors can be brought into alignment with two marginal bores of abutting panels, said connecting means further including cotter pins for insertion into aligned bores.

11. The light reflector of claim 1 wherein the connecting means includes a tension lever type locking mechanism for joining two abutting panels.

12. The light reflector of claim 1 wherein one of the metal plates has eight pins for insertion in eight complementary bores formed in the four contiguous panel corners, with the other one of the metal plates having holes in alignment with the pins.

13. The light reflector of claim 1 wherein at least one of the metal plates has means for connection to a head portion of stand and/or for attachment of further auxiliary parts.

14. A light reflector, comprising a plurality of panels of same size and having at least one reflecting side; and connecting means butt-jointing the panels to one another, wherein the connecting means includes connectors of U-shaped configuration for placement over edges of abutting panels, thereby bridging a joint between the abutting panels, each of the abutting panels including a marginal bore in an area of each corner, and each of the connectors including two bores spaced at a distance which is twice the distance of the marginal bore to a nearest corner, so that the bores of the connectors can be brought into alignment with two marginal bores of abutting panels, said connecting means further including cotter pins for insertion into aligned bores.

15. A light reflector, comprising a plurality of panels of same size and having at least one reflecting side; and connecting means butt-jointing the panels to one another, wherein the connecting means includes two metal plates for interconnecting four contiguous panel corners which are positioned between the metal plates, and fastening means for securing the metal plates to one another, wherein one of the metal plates has eight pins for insertion in eight complementary bores formed in the four contiguous panel corners, with the other one of the metal plates having holes in alignment with the pins.

* * * * *